United States Patent
Pilli

(10) Patent No.: US 11,692,746 B2
(45) Date of Patent: Jul. 4, 2023

(54) SYSTEM AND METHOD FOR EVAPORATIVE COOLING AND HEATING

(71) Applicant: Carrier Corporation, Palm Beach Gardens, FL (US)

(72) Inventor: Srinivasa Reddy Pilli, Andhra Pradesh (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,896

(22) PCT Filed: Jun. 4, 2019

(86) PCT No.: PCT/US2019/035408
§ 371 (c)(1),
(2) Date: Dec. 3, 2020

(87) PCT Pub. No.: WO2019/236592
PCT Pub. Date: Dec. 12, 2019

(65) Prior Publication Data
US 2021/0222921 A1 Jul. 22, 2021

(30) Foreign Application Priority Data
Jun. 5, 2018 (IN) .............................. 201811021042

(51) Int. Cl.
*F25B 30/04* (2006.01)
*F25B 17/08* (2006.01)
(Continued)

(52) U.S. Cl.
CPC .............. *F25B 30/04* (2013.01); *F25B 17/08* (2013.01); *F25B 27/007* (2013.01); *F25B 35/04* (2013.01)

(58) Field of Classification Search
CPC ........ F25B 30/04; F25B 17/08; F25B 27/007; F25B 35/04
(Continued)

(56) References Cited

U.S. PATENT DOCUMENTS

| 4,448,030 A | 5/1984 | Moss |
| 4,924,676 A | 5/1990 | Maier-Laxhuber et al. |

(Continued)

FOREIGN PATENT DOCUMENTS

| DE | 202007009604 U1 | 9/2007 |
| EP | 0577869 A1 | 1/1994 |

(Continued)

OTHER PUBLICATIONS

IPRP; Application No. PCT/US2019/035408; dated Dec. 17, 2020; 12 pages.

(Continued)

*Primary Examiner* — Steve S Tanenbaum
(74) *Attorney, Agent, or Firm* — Cantor Colburn LLP

(57) ABSTRACT

Disclosed is a system for conditioning air, the system comprising: a heat exchanger comprising a plurality of heat transfer tubes extending between an accumulation header and an outlet header, an internal volume, and an external surface, wherein an air mover is disposed in fluid communication with an air mover in fluid communication with an air inlet and an air outlet, wherein the air mover is configured to urge a flow of air to be conditioned across the external surface of the heat exchanger, a reactor comprising an adsorbent material, a reactor inlet in fluid communication with the outlet header, and a reactor outlet, a vacuum pump comprising a vacuum pump inlet in fluid communication with the reactor outlet and a vacuum pump outlet in fluid communication with a system exhaust.

9 Claims, 3 Drawing Sheets

(51) Int. Cl.
*F25B 27/00* (2006.01)
*F25B 35/04* (2006.01)

(58) Field of Classification Search
USPC ........................................... 62/235.1
See application file for complete search history.

(56) References Cited

U.S. PATENT DOCUMENTS

| | | | |
|---|---|---|---|
| 5,221,520 A * | 6/1993 | Cornwell | A61L 9/16 |
| | | | 422/4 |
| 5,415,012 A * | 5/1995 | Maier-Laxhuber | F25B 17/083 |
| | | | 62/299 |
| 5,580,369 A | 12/1996 | Belding et al. | |
| 5,718,119 A * | 2/1998 | Wakita | F25B 45/00 |
| | | | 62/85 |
| 6,048,509 A | 4/2000 | Kawai et al. | |
| 6,074,972 A | 6/2000 | Bratton et al. | |
| 6,402,809 B1 | 6/2002 | Monereau et al. | |
| 6,412,295 B2 | 7/2002 | Weiss et al. | |
| 7,065,981 B2 | 6/2006 | Ebbeson | |
| 7,381,244 B2 | 6/2008 | Tyndall et al. | |
| 7,422,993 B2 | 9/2008 | Takewaki et al. | |
| 8,157,892 B2 | 4/2012 | Meirav | |
| 8,496,732 B2 | 7/2013 | Culp et al. | |
| 8,883,083 B2 | 11/2014 | Law et al. | |
| 9,316,410 B2 | 4/2016 | Meirav et al. | |
| 9,387,457 B2 | 7/2016 | Chen et al. | |
| 9,631,848 B2 | 4/2017 | Vandermeulen et al. | |
| 9,810,439 B2 | 11/2017 | Coutu et al. | |
| 2013/0192281 A1 * | 8/2013 | Nam | F28D 17/00 |
| | | | 62/476 |
| 2013/0291574 A1 * | 11/2013 | Athalye | F25B 17/00 |
| | | | 62/476 |

FOREIGN PATENT DOCUMENTS

| | | |
|---|---|---|
| EP | 1307276 B1 | 7/2006 |
| EP | 2197699 A1 | 11/2011 |
| EP | 2623346 A2 | 8/2013 |
| EP | 3306225 A1 | 4/2018 |
| WO | 2017042759 A1 | 3/2017 |

OTHER PUBLICATIONS

ISR/WO; Application No. PCT/US2019; 035408; dated Aug. 28, 2019; 17 pages.

* cited by examiner

SYSTEM AND METHOD FOR EVAPORATIVE COOLING AND HEATING

CROSS REFERENCE TO RELATED APPLICATIONS

This is a US National Stage of Application No. PCT/US2019/035408, filed on Jun. 4, 2019, which claims the benefit of IN Application No. 201811021042 filed Jun. 5, 2018, the disclosures of which are incorporated herein by reference.

BACKGROUND

Exemplary embodiments pertain to the art of air conditioners and more specifically to conditioning through evaporative cooling and heating.

Compared with conventional processes, a system and process is desired for conditioning air that is capable of being operated with relatively low maintenance costs, which wastes less water, and which provides low humidity and low dust air.

Evaporative coolers may not remove sufficient moisture when conditioning air. A solution is therefore desired for removing moisture from air.

BRIEF DESCRIPTION

Disclosed is a system for conditioning air, the system comprising: a heat exchanger comprising a plurality of heat transfer tubes extending between an accumulation header and an outlet header, an internal volume, and an external surface, wherein an air mover is disposed in fluid communication with an air mover in fluid communication with an air inlet and an air outlet, wherein the air mover is configured to urge a flow of air to be conditioned across the external surface of the heat exchanger, a reactor comprising an adsorbent material, a reactor inlet in fluid communication with the outlet header, and a reactor outlet, a vacuum pump comprising a vacuum pump inlet in fluid communication with the reactor outlet and a vacuum pump outlet in fluid communication with a system exhaust.

In addition to one or more of the above disclosed features or as an alternate the adsorbent material comprises a zeolite.

In addition to one or more of the above disclosed features or as an alternate the air mover comprises any one of a centrifugal blower, an axial flow fan, a radial flow fan, or a mixed axial and radial flow fan.

In addition to one or more of the above disclosed features or as an alternate the air mover is a fan disposed fluidly upstream of the heat exchanger.

In addition to one or more of the above disclosed features or as an alternate the system comprises an air filter fluidly downstream of the system air inlet, the filter comprising a zeolite, wherein when the air mover urges the flow of air to be conditioned through the filter, and the filter removes particulates from the air.

In addition to one or more of the above disclosed features or as an alternate the heat exchanger is a microchannel heat exchanger, comprising tubes having multiple ports.

In addition to one or more of the above disclosed features or as an alternate the heat exchanger comprises a heating element operational to raise temperature of conditioned air.

In addition to one or more of the above disclosed features or as an alternate the system further comprises a solar panel configured to provide power to one or more of the vacuum pump, the blower and the heating element.

In addition to one or more of the above disclosed features or as an alternate the heat exchanger stores water and water vapor.

In addition to one or more of the above disclosed features or as an alternate the zeolite in the reactor comprises zeolite beads.

In addition to one or more of the above disclosed features or as an alternate the internal volume of the heat exchanger is at least partially filled with a water vapor, wherein the vacuum pump urges a fluid containing the water vapor from the heat exchanger through the reactor and out the system exhaust, and wherein within the reactor a water molecule is adsorbed from the fluid onto a surface of the adsorbent material releasing a heat of adsorption and raising a bulk gas temperature of the fluid.

Further disclosed is a method for conditioning air through a system, comprising: reducing a pressure of an internal volume of a heat exchanger by urging a fluid containing a gas phase water molecule from the heat exchanger with a vacuum pump, vaporizing water within the heat exchanger containing a two-phase water and air system as the fluid is urged from the heat exchanger, moving the fluid from an internal volume of the heat exchanger into the reactor comprising an adsorbent material, adsorbing the gas phase water molecule onto the surface of the adsorbent material thereby decreasing the gas phase water concentration of the fluid to an exit water concentration of the reactor exit water concentration and releasing thermal energy thereby increasing a bulk gas temperature of the fluid, and expelling the fluid from a system exhaust, and moving a volume of air to be conditioned across an external surface of the heat exchanger and through an air outlet.

In addition to one or more of the above disclosed aspects or as an alternate the method comprises filtering air entering the system with a zeolite filter.

In addition to one or more of the above disclosed aspects or as an alternate the method comprises raising a temperature of the volume of air to be conditioned air with a heating element.

In addition to one or more of the above disclosed aspects or as an alternate the method comprises comprising preventing water from freezing in the heat exchanger with the heating element.

In addition to one or more of the above disclosed aspects or as an alternate the method comprises energizing the heating element to raise the temperature of the volume of air to be conditioned upon determining that air flowing through the air outlet is below a set point temperature.

In addition to one or more of the above disclosed aspects or as an alternate the method comprises monitoring at least one of a reactor outlet temperature, a bulk gas temperature rise of the reactor, an adsorbent material temperature, and a system exhaust temperature to identify when a useful capacity of the adsorbent material is being reached.

In addition to one or more of the above disclosed aspects or as an alternate the method comprises monitoring a liquid water level in the heat exchanger 35 to identify when water in the heat exchanger reaches a lower level limit.

In addition to one or more of the above disclosed aspects or as an alternate the method comprises moving the fluid from the internal volume of the heat exchanger into the reactor with the vacuum pump.

In addition to one or more of the above disclosed aspects or as an alternate the method comprises expelling the fluid from the system exhaust with the vacuum pump.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
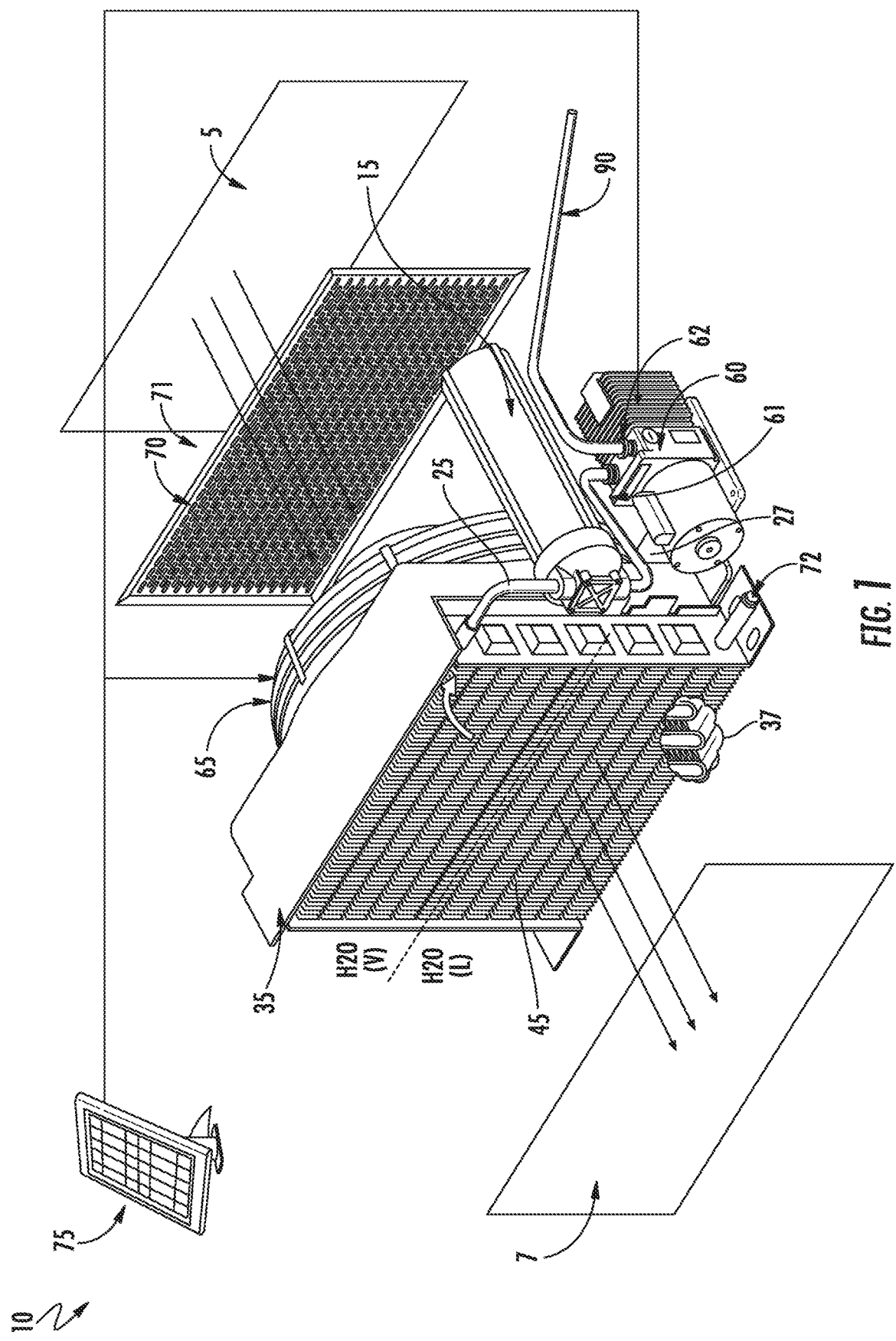
FIG. 1 illustrates a system for conditioning air according to an embodiment.

FIG. 1 illustrates a system 10 for conditioning air. The system 10 can include a heat exchanger 35, a reactor 15, a vacuum pump 60, and an air mover 65. The system 10 can further include an air inlet 5 and an air outlet 7. The air inlet 5 and the air outlet 7 can be disposed in fluid communication with the air mover 65. The system 10 can be configured to draw air from a volume of air to be conditioned (e.g., air disposed in an occupied building space) through the air inlet 5, across an external surface of the heat exchanger 35 (e.g., tube external surface, secondary surfaces such as fins, and the like), and exhaust the air through the air outlet 7. The air inlet 5 can include an air inlet filter 70, an air inlet cover 71, or a combination thereof. The system 10 can be housed in an enclosure such that the air to be conditioned can be drawn into, through, and out of the enclosure. The system 10 can further include plumbing for conveying the system fluids between the indicated components, electrical wiring, sensors, and a control system.

The reactor 15 can include a volume of adsorbent material 20 which can include a zeolite material (e.g., natural zeolites, formed zeolite beads) contained within a reactor housing. The reactor 15 can include a reactor inlet 25 for fluidly transporting a fluid (e.g., humid air, nearly pure water vapor with some air) into the reactor 15. The reactor can include a reactor outlet 27 for transporting a fluid (e.g., dry hot air) from the reactor 15.

The heat exchanger 35 can include a plurality of heat exchanger tubes disposed adjacent to one another and extending between two headers. The heat exchanger 35 can include fins. The fins can be disposed adjacent to and in thermal communication with one or more of the plurality of heat exchanger tubes. The heat exchanger 35 can include an internal volume 37, which can include a volume internal to the plurality of heat exchanger tubes and a volume internal to the headers. The heat exchanger 35 can further include a fill port in fluid communication with the internal volume (e.g., coupled to a header).

The heat exchanger 35 can be of any suitable design, for example round tube plate fin (RTPF), microchannel, and the like. In an embodiment, the heat exchanger 35 is a microchannel heat exchanger where a microchannel tube includes an array of multiple parallel ports. The heat exchanger 35 can have an outlet header and an accumulation header at either end of the plurality of tubes. The heat exchanger 35 can be oriented vertically (e.g., slanted vertically or plumb) such that the tubes extend in the direction of gravity and liquid within the tubes can be urged toward the accumulation header by the force of gravity. When configured in the vertical orientation, the upper header can act as the outlet header and be disposed in fluid communication with the reactor inlet and the lower header can act as the accumulation header.

The heat exchanger 35 can be partially filled with liquid water through the fill port creating two-phase air-water system in the internal volume of the heat exchanger 35. During operation, the vacuum pump 60 pulls fluid (e.g., at least initially containing air and water vapor) from the heat exchanger 35 to the reactor 15. As the vacuum pump 60 pulls material from within the internal volume of the heat exchanger 35, lowering the pressure and favoring boiling, a portion of the remaining liquid water vaporizes (e.g., to reach equilibrium conditions for the air-water system). The vaporization/evaporation occurring in the heat exchanger 35 cools the remaining liquid water and adjacent heat exchanger surfaces through evaporative cooling, where the cooling effect is thermodynamically related to the enthalpy of vaporization. At the outside of the heat exchanger 35, the air mover 65 can urge a flow of air from a volume of air to be conditioned through the air inlet 5, across the external surfaces of the heat exchanger thereby cooling the air, and out the air outlet 7. The air outlet 7 can be configured to return the cooled air to the space enclosing the volume of air to be conditioned.

At the reactor 15 the adsorbent material 20 adsorbs water molecules from the fluid onto the surface of the adsorbent (e.g., zeolite material) thereby releasing thermal energy into the surrounding, where the released heat is thermodynamically related to the enthalpy of adsorption. The released thermal energy can raise the temperature of the adsorbent material and transfer to the adjacent fluid as the fluid traverses from the reactor inlet 25 to the reactor outlet 27 due to the urging of the vacuum pump 60. Consequently, during normal operation, the moisture content of the fluid decreases and the bulk fluid temperature increases as the fluid traverses through the reactor 15. The amount of water adsorbed and corresponding heat released in the reactor is at least related to the adsorption characteristics (e.g., adsorption isotherm, flow arrangement, reactor length, and the like) of the reactor 15.

Figure 3:
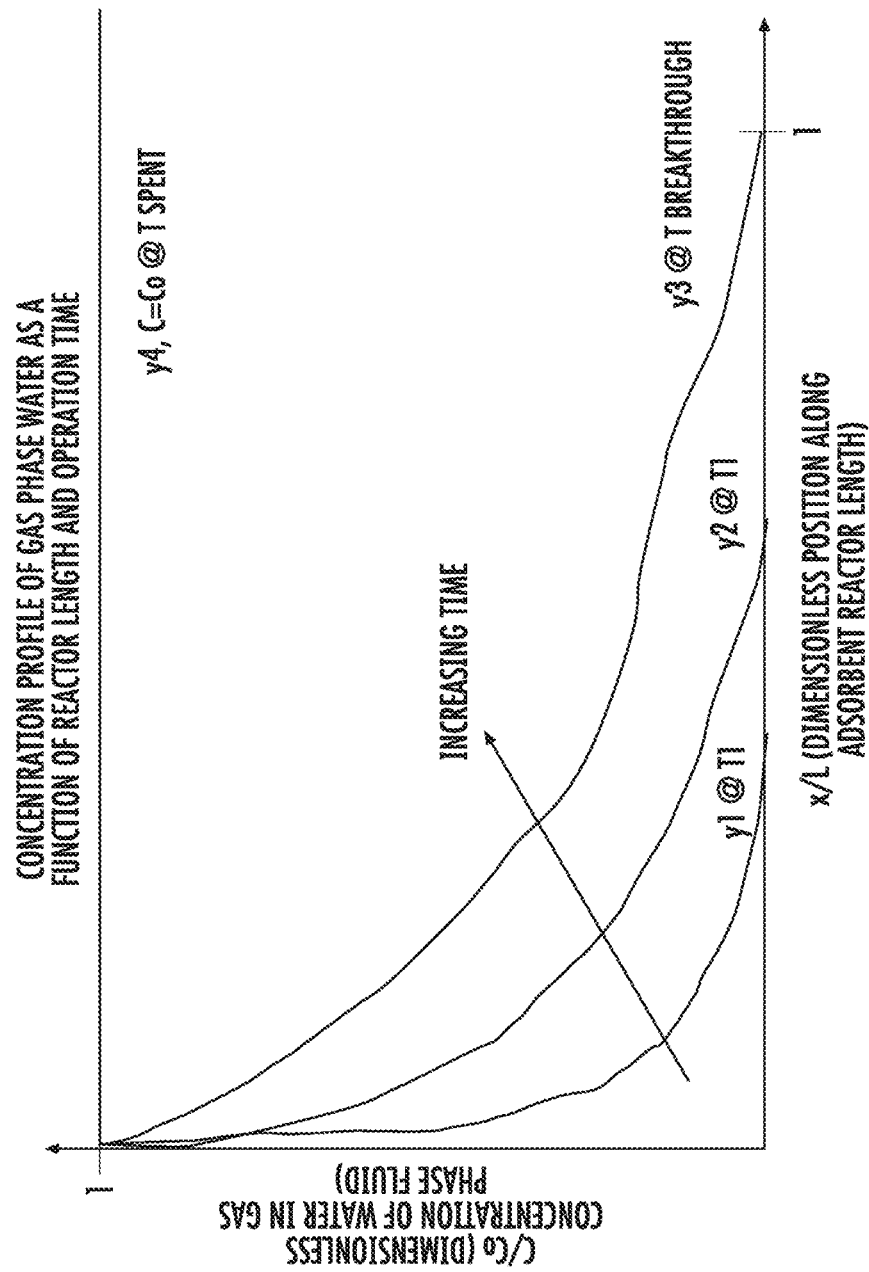
FIG. 3 is a concentration profile of gas phase water as a function of reactor length and operation time.

Referring to FIG. 3, shortly after starting the system 10 at time Ti, the system exhaust 90 should include dry hot air since the concentration of water vapor in the gas phase is reduced to zero as it traverses the length of the reactor 15 according to line y1. As the adsorbent material is spent (e.g., unable to adsorb water vapor) the concentration of vapor phase water exiting the reactor through the reactor outlet 27 will approach the concentration of vapor phase water entering the reactor 15 at the reactor inlet 25 which is shown in lines y2, y3, and y4. Correspondingly, as the adsorbent material is spent (e.g., unable to adsorb water vapor) the bulk temperature of the fluid exiting the reactor through the reactor outlet 27 will approach the bulk temperature of fluid entering the reactor 15 at the reactor inlet 25. Note that at some time before the time the adsorbent material is completely consumed (Tspent) the concentration of water in the gas phase exiting the reactor 15 through the reactor outlet 27 (reactor exit water concentration) will start to increase above zero (or some minimal physical limit value). This time is termed the breakthrough time when the first molecules of water are able to transit the reactor 15 without being absorbed.

The system 10 may include a vacuum pump 60 fluidly connected to the reactor outlet 27 of the reactor 15. The vacuum pump 60 can include a vacuum pump inlet 61 in fluid communication with the reactor outlet 27 and a vacuum pump outlet 62 in fluid communication with a system exhaust 90. The vacuum pump 60 can be configured to pull fluid from the heat exchanger 35, through the reactor 15, and expel the fluid (and any captured thermal energy) out from the system 10 through the system exhaust 90.

An air mover 65 can include any suitable device for urging a volume flow through the system 10. For example, the air mover can include a blower (e.g., squirrel cage blower), a fan (e.g., axial flow fan, a centrifugal flow fan, a mixed flow fan) or the like. The air mover 65 can be shrouded for directionally urging air through the heat exchanger 35.

The adsorbent material 20 can include a zeolite which is a highly porous mineral composed of Alumino-Silicates. These minerals have strong adsorption capabilities that can capture water, metal-cations and heat depending on the ratio between Aluminum and Silicon in the mineral. The adsorption reaction can be described as:

$$A + H2O \leftrightarrow A\text{-}H2O + Heat$$

Where, A refers to solid adsorbent material (e.g. zeolite) and A-H2O refers to water adsorbed onto the surface of the adsorbent material.

Figure 2:
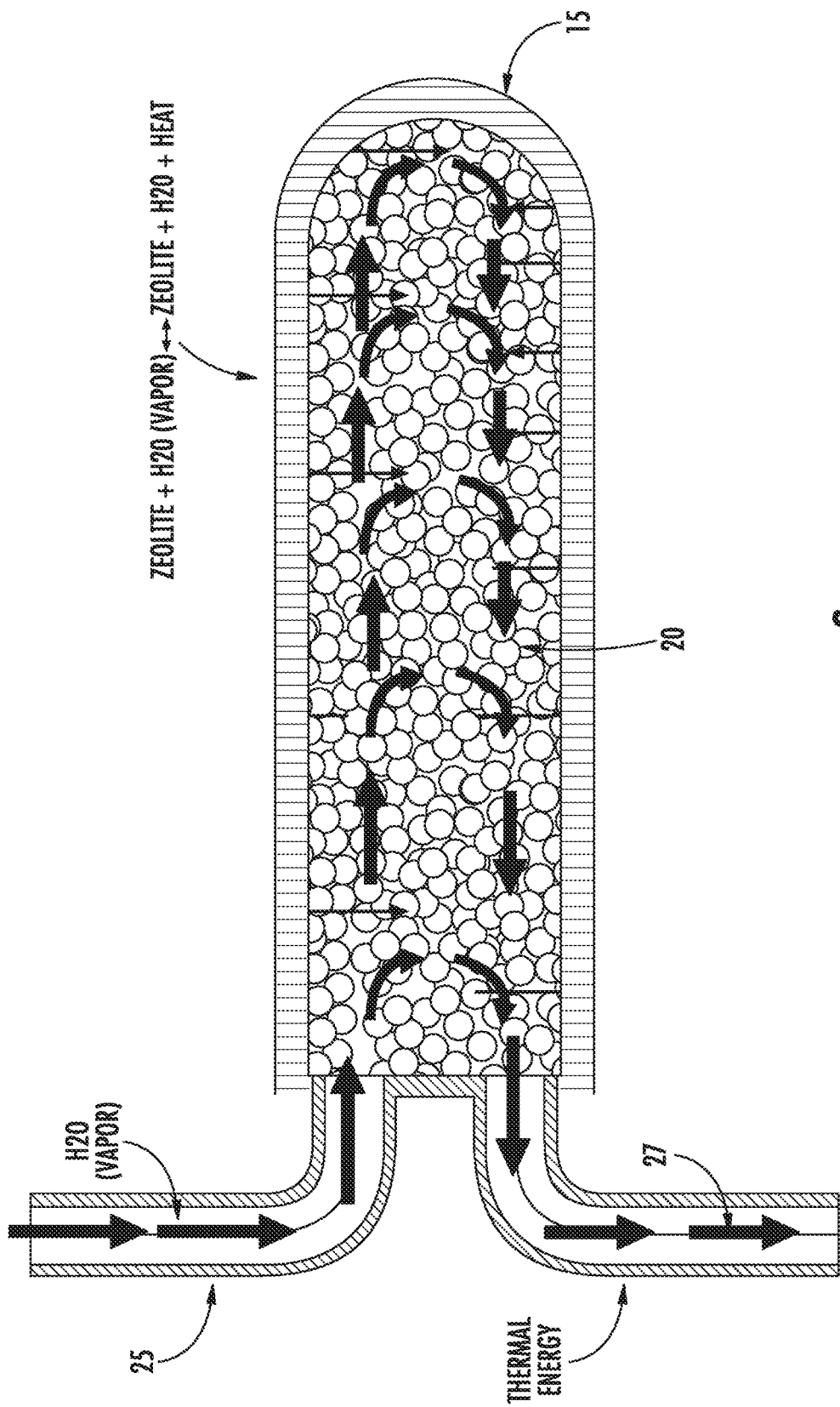
FIG. 2 illustrates a reaction chamber according to a disclosed embodiment.

As indicated, this process is reversible. Eventually, the adsorbent material 20 (e.g., zeolite) will be consumed by the above process. That is, the useful capacity of the adsorbent material 20 to adsorb water vapor will eventually be reached. This may be discernable by a decreased efficiency of the cooling process. For example, as the adsorbent captures more water molecules thereby reducing the bed capacity, a bulk gas temperature rise of the reactor (e.g., measured as the difference in bulk gas temperature measured at the outlet minus the bulk gas temperature at the outlet of the reactor 15) can decrease. The decreased temperature rise of the reactor is due to a decrease in the thermal energy released via the adsorption process. Similarly, an adsorbent material temperature (e.g. temperature of solid adsorbent material) a reactor outlet temperature, a system exhaust temperature or a combination comprising at least one of the foregoing can decrease as the adsorbent capacity is reduced indicative of reduced adsorption capacity. At such time, or in anticipation of such time, it may be desirable to exchange the adsorbent material 20 (e.g., zeolite) for a fresh/dry volume. Optionally, as the process is reversible, zeolite beads in the reactor 15 (such as illustrated in FIG. 2, which is not intended to be limiting) can be recycled for further use. Similarly, the water in the heat exchanger 35 is a consumable. Water needs to be charged initially and then re-filled, for example, periodically. When the water has been consumed, air pushed by the fan 65 will be only cooled by the action of the fan 65 and this may present similarly to a decreased capacity of the zeolite 20.

A filter 70 may be fluidly upstream of the third passage 45. The filter 70 may be a zeolite filter. A thickness of the filter 70 may be, for example, 3-5 mm. When the fan 65 urges air through the third passage 45 the filter 70 may remove thermal energy from the air. The cooling effect from the filter 70, as can be appreciated, may be typically less than the cooling effect from the evaporation of water in the heat exchanger 35. An amount of thermal energy as heat removed by the filter 70 may be limited to around 5%-10%. In addition, the filter 70 may serve to filter dust as well.

The heat exchanger 35 may comprise a heater 72 operational to raise temperature of conditioned air. For example, a heater 72 can include an electrical resistance heater, a fuel fired heater, an induction heater, or the like. The heater 72 can be located in the accumulation header of the heat exchanger 35 (e.g., a vertically lower header). During operation, if the temperature of the air flowing through the air outlet 7 falls below a comfort set point the heating element 72 may be engaged. The heating element 72 can also be engaged to prevent the water from freezing in the heat exchanger 35. In an embodiment, the heating element 72 is a submersible heating rod.

In addition, if the air dew point is higher than that of the heat exchanger surface(s) water from the air may condense on the heat exchanger 35. This condensed water may be reclaimed for reuse within the present system (e.g., by returning to a fill port of the heat exchanger 35).

As illustrated, the system 10 may include a solar panel 75. According to any embodiment disclosed herein, one or more of the vacuum pump 60, the fan 65 and the heating element 72 may be solar powered.

It is to be appreciated that natural convection can induce flow from the heat exchanger 35 to the zeolite material at times when the vacuum pump 60 is not activated. The reactor 15 can include a housing, which stores the adsorbent material 20. The housing can be formed from any suitable material that can withstand the vacuum pressure and elevated temperatures during operation, suitable materials include plastic (e.g., PVC), metal.

Evaporation is an endothermic process, which removes heat energy from the surroundings. In some cases, evaporative cooling of liquid water in the heat exchanger 35 may favor forming ice. Conditions may be regulated to prevent ice formation, for example, with use of the heat element 72 or by regulating (e.g., turning on/off, modulating speed, frequency, and/or flowrate) the vacuum pump 60 or fan 65.

The above system and process, compared with conventional processes, may provide relatively low cost maintenance, less water waste, low humidity and low dust air.

In use, the system may be placed in a room to be cooled, such as within residential or commercial space. The air to be cooled may come from within the same space for from an exterior space, such as the outside. The exhausted heat would be directed to the outside perhaps to be recaptured or use in which heating is desired.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for conditioning air, the system comprising:
an enclosure in which the system is enclosed, the enclosure defining an air inlet and an air outlet,
a heat exchanger housed within the enclosure between the air inlet and the air outlet such that the air inlet is on one side of the heat exchanger and the air outlet is on another side of the heat exchanger, and an air filter between the air inlet and the heat exchanger, the air filter comprising zeolite,
the heat exchanger comprising a plurality of heat transfer tubes, a lower header that is an accumulation header and an upper header that is an outlet header, the plurality of heat transfer tubes extending between the accumulation header and the outlet header, wherein the heat exchanger defines an internal volume, and an external surface, and the heat exchanger is at least partially filled with two-phase liquid,
an air mover housed within the enclosure between the heat exchanger and the air inlet, the air mover is disposed in fluid communication with the air inlet and the air outlet, wherein the air mover is configured to urge a flow of air to be conditioned across the external surface of the heat exchanger,
a reactor within the enclosure, the reactor comprising reactor housing, an adsorbent material within the reactor housing, wherein the adsorbent material comprises zeolite beads, the reactor housing defining a rector inlet and a reactor outlet, the reactor inlet is fluidly coupled to the outlet header within the enclosure,
a vacuum pump within the enclosure, the vacuum pump comprising a vacuum pump inlet and a vacuum pump outlet, wherein the vacuum pump inlet is fluidly coupled to the reactor outlet within the enclosure,
wherein the reactor is configured to receive vapor from the two-phase water vacuum pressure from the vacuum pump or from natural convection, and
a system exhaust, wherein the vacuum pump outlet is in fluid communication with the system exhaust,
wherein:
the reactor is connected directly to the outlet header of the heat exchanger, the pump is connected directly to the outlet of the reactor; and
the reactor, the heat exchanger and the pump are located adjacent to each other within the enclosure.

2. The system of claim 1 wherein the air mover comprises any one of a centrifugal blower, an axial flow fan, a radial flow fan, or a mixed axial and radial flow fan.

3. The system of claim 1 wherein the air mover is disposed fluidly upstream of the heat exchanger.

4. The system of claim 1 wherein when the air mover urges the flow of air to be conditioned through the filter and the filter removes particulates from the air.

5. The system of claim 1 wherein the heat exchanger is a microchannel heat exchanger, comprising tubes having multiple ports.

6. The system of claim 1 wherein the heat exchanger stores water and water vapor.

7. The system of claim 1 wherein the internal volume of the heat exchanger is at least partially filled with a water vapor,
wherein the vacuum pump urges a fluid containing the water vapor from the heat exchanger through the reactor and out the system exhaust, and
wherein within the reactor a water molecule is adsorbed from the fluid onto a surface of the adsorbent material releasing a heat of adsorption and raising a bulk gas temperature of the fluid.

8. The system of claim 1 wherein the heat exchanger comprises a heating element operational to raise temperature of conditioned air.

9. The system of claim 8 further comprising a solar panel configured to provide power to one or more of the vacuum pump, the air mover and the heating element.

* * * * *